United States Patent [19]
Verboom et al.

[11] Patent Number: 6,091,687
[45] Date of Patent: Jul. 18, 2000

[54] METHOD AND APPARATUS FOR MAXIMUM LIKELIHOOD DETECTION

[75] Inventors: Johannes J. Verboom; Fred N. Wamble, both of Colorado Springs, Colo.

[73] Assignee: Philips Electronics N.A. Corporation, New York, N.Y.

[21] Appl. No.: 08/994,874

[22] Filed: Dec. 19, 1997

[51] Int. Cl.[7] ................................................. G11B 7/00
[52] U.S. Cl. ............................................................ 369/59
[58] Field of Search ................................. 369/58, 47, 54, 369/124, 59, 60; 360/32, 30, 48, 25, 27

[56] References Cited

U.S. PATENT DOCUMENTS

| | | | |
|---|---|---|---|
| 4,142,210 | 2/1979 | Otobe et al. | 369/56 |
| 4,246,615 | 1/1981 | Shiraishi et al. | 360/32 |
| 4,689,779 | 8/1987 | Hayashi et al. | 369/54 |
| 4,774,601 | 9/1988 | Ouchi et al. | 369/47 |
| 4,823,208 | 4/1989 | Ouchi et al. | 360/46 |
| 5,136,652 | 8/1992 | Jibbe et al. | 381/31 |
| 5,233,584 | 8/1993 | Kulakowski et al. | 369/58 |
| 5,424,883 | 6/1995 | Koren | 360/65 |
| 5,485,433 | 1/1996 | Satomura et al. | 369/58 |
| 5,592,456 | 1/1997 | Miyashita et al. | 369/59 |
| 5,648,949 | 7/1997 | Miyamoto et al. | 369/59 |
| 5,661,713 | 8/1997 | Honma | 369/59 |
| 5,675,569 | 10/1997 | Yamaguchi et al. | 369/59 |
| 5,684,772 | 11/1997 | Yamagami et al. | 369/59 |
| 5,696,757 | 12/1997 | Ozaki et al. | 369/58 |
| 5,761,171 | 10/1995 | Tobita | 369/59 |
| 5,764,608 | 7/1995 | Satomura | 369/59 |
| 5,790,495 | 8/1998 | Kimura et al. | 369/59 |
| 5,825,744 | 5/1996 | Hutchins et al. | 369/59 |
| 5,841,751 | 5/1997 | Komazaki et al. | 369/59 |

*Primary Examiner*—Nabil Hindi

[57] ABSTRACT

A method and apparatus for recovering data from an optical read channel provides for improved recording density by tolerating lower phase and amplitude margins. The method includes digitizing a plurality of samples of a first signal, clipping the digitized samples of the first signal, digitally differentiating the clipped digitized samples, determining the relative locations of signal polarity changes, and generating logical values for channel bits based, at least in part, on the relative locations of signal polarity changes. The apparatus for recovering data from an optical read channel includes a signal-level limiter, a digital differentiator coupled to the signal-level limiter, a min/max detector coupled to the digital differentiator, a zero-crossing detector coupled to the digital differentiator, an update signal generator coupled to the zero-crossing detector and the min/max detector, and a channel bit transition generator.

19 Claims, 4 Drawing Sheets

METHOD AND APPARATUS FOR MAXIMUM LIKELIHOOD DETECTION

BACKGROUND OF THE INVENTION

The invention relates generally to data recovery from optical media storage systems, and more particularly to methods and apparatuses for data recovery in the absence of threshold detection.

Advances in manufacturing technologies and system architecture have led to increasingly powerful consumer electronic devices and computers. These consumer electronic devices and computers support features and applications, such as multimedia presentations, in connection with which vast amounts of information are processed and stored. Generally, the amount of information is not only vast, but also ever-increasing.

To provide the information, optical storage and retrieval systems have been developed, including in the form of optical disk drives and media. To provide ever-increasing amounts of information, these optical storage and retrieval systems require ongoing improvements that overcome factors limiting system capacity, including, among other things, improving detection of recorded information.

Detection of recorded information is conventionally accomplished using a threshold. More specifically, channel bits of an optical read channel (using, for example, 1,7 run-length-limited modulation coding) are detected by comparing a read signal to a predetermined threshold: if the read signal exceeds the threshold at a particular channel-bit location, that channel-bit is considered a '1'; otherwise the channel-bit is considered a '0'.

Detection against a threshold relies on appropriately setting the threshold. Generally, the threshold is set toward recovering data from the recording media within an acceptable bit error rate. To do so, the threshold optimally is set to the center of an "eye-pattern", the eye-pattern being a measure that indicates the amplitude and phase margins of the read signal. However, the read signal's amplitude and phase margins tend to be affected by various parameters, including, among others, the write power, the write sensitivity of the media, the quality of the optical spot of the write and read drives, the focus offset of the write and read drives, and the recording density (on optical disk media, recording density varies with radial position). Because these parameters vary across systems and media, the center of the eye pattern tends to vary and, in turn, the optimal threshold setting tends to vary. Being subject to such variations, threshold detection technologies are limited.

Accordingly, it is desirable to provide a method and apparatus that, in detection, overcomes conventional technologies' reliance on threshold setting.

SUMMARY OF THE INVENTION

Briefly, a method and apparatus is provided for recovering data from an optical read channel by tolerating lower phase and amplitude margins. A method embodying the present invention includes digitizing a plurality of samples of a first signal, clipping the digitized samples of the first signal, digitally differentiating the clipped digitized samples, determining the relative locations of signal polarity changes associated with the first signal, and generating logical values for channel bits based, at least in part, on the relative locations of signal polarity changes.

In a further embodiment of the present invention, an apparatus for recovering data from an optical read channel includes a signal-level limiter, a digital differentiator coupled to the signal-level limiter, a comparator coupled to the digital differentiator, a zero-crossing detector coupled to the digital differentiator, an update signal generator coupled to the zero-crossing detector and the comparator, and a channel bit transition generator.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

BRIEF DESCRIPTION OF THE DRAWINGS

FIG. 1 (b) shows a read signal, with and without clipping, including reference marks, data marks and clip levels.

DETAILED DESCRIPTION

Terminology

Read channel, as used herein, refers to the electrical, optical and mechanical elements that deliver signals from the surface of an optical medium to processing elements for conversion to formats convenient for a user.

K-constraint, as used herein, refers to the maximum number of consecutive logical zeros in any sequence of binary channel bits, in which the logical ones represent the location of signal transitions.

Overview

Embodiments of the present invention detect the logical polarity, i.e., '1' or '0', of channel-bits by selectively clipping the read signal and analyzing the slopes of the clipped read signal to find where bit sequence transitions take place. This provides a read channel without the need of a threshold-based detection arrangement.

Clipping

In an illustrative embodiment of the present invention, a disk is formatted to comprise a plurality of tracks, each track including a selected number of segments (e.g., 225) with each segment having a selected number of frames (e.g., 16). Each frame comprises one or more fields. The fields contain pre-formatted marks that are employed to provide selected functions, including, among others, clock synchronization, track following, track capturing, addressing and track counting.

Each frame also comprises a recordable field. The recordable field is provided for recording user data. The data is organized in logical sectors, each sector preferably beginning at a frame boundary. Each sector comprises a selected number (e.g., 1024 or 2048) of data bytes, together with other information. Such other information provides one or more functions including, among others, error correction.

Figure 1A:
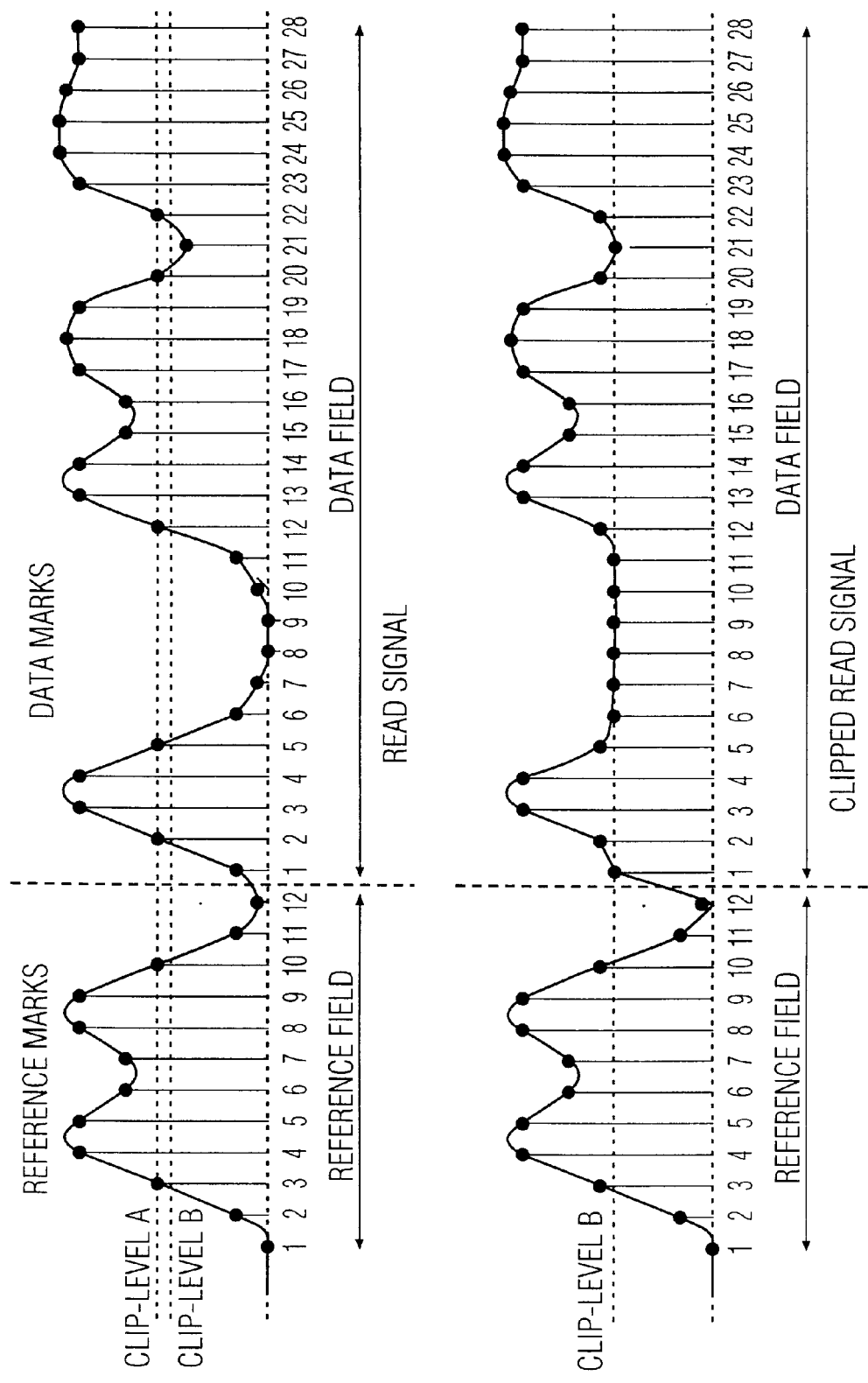
FIG. 1 (a) shows a read signal, with and without clipping, including reference marks, data marks and clip levels.
Figure 1B:
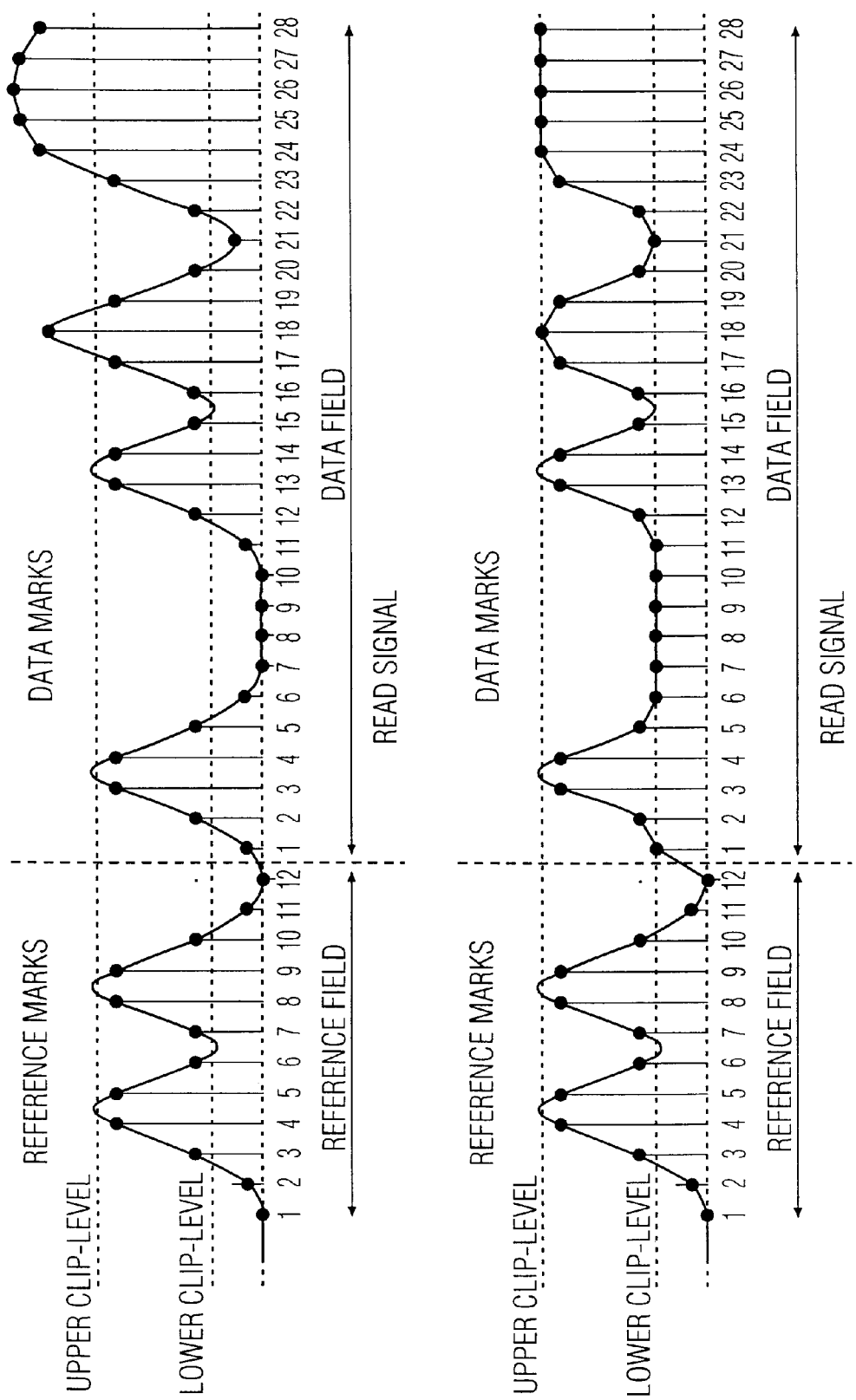
Figure 2:
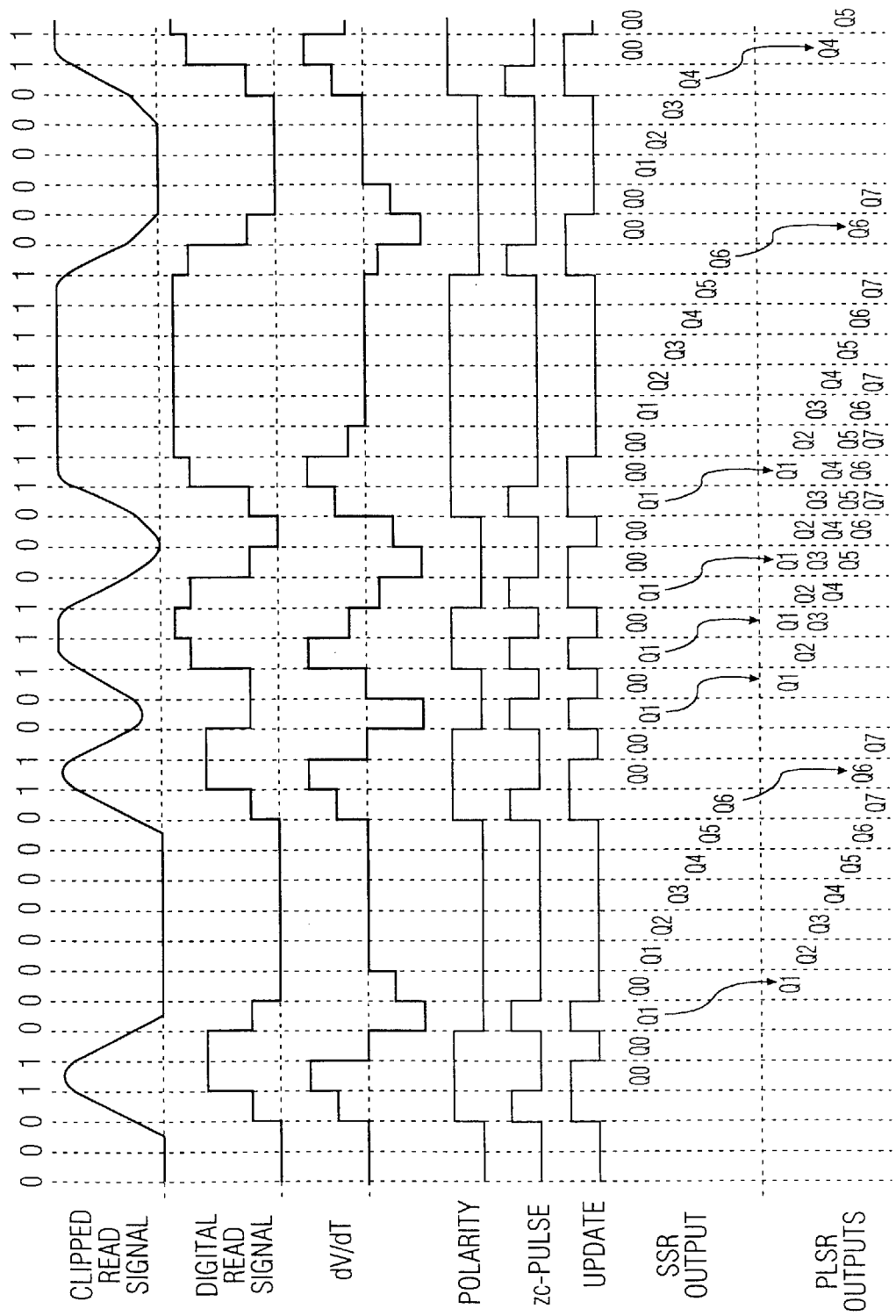
FIG. 2 shows various waveforms associated with the read channel.

FIGS. 1 (a) and (b) show typical read signals, with and without clipping, according to the present invention. Each read signal includes (i) reference marks in a reference field and (ii) illustrative data marks in a data field, the data marks comprising user data. Although the read signal is analog, it preferably is processed (including as to clipping) as discrete values sampled at a selected frequency.

FIGS. 1 (*a*) and 1 (*b*) also illustrate that a typical read signal has positive- and negative-going slopes that, on occasion, cover a several channel bits. In detecting the information contained in the read signal, it is preferred to constrain the slopes to one or two channel bits.

FIG. 1 (*a*) depicts a read signal that is clipped only in its lower portion. Such clipping is desirable because the read signal's information is substantially contained in its upper portion and because, in this case, the recorded marks are generally relatively larger in size than the spaces resulting in an upward shift of the eye patterns.

FIG. 1 (*b*) depicts a read signal that is clipped in both its lower portion and in its upper portion. Although the signal's upper portion substantially contains the signal's information, clipping of the read signal's upper portion is desirable under certain circumstances. As an example, upper portion clipping is desirable where, as here, the read signal contains one or two adjacent channel bits that display a substantial slope and, after which, the slope proceeds but without providing additional information. More specifically, this circumstance is illustrated in channel bits 22–28 of FIG. 1 (*b*): (i) a significant slope occurs in channel bits 22–23 and (ii) the slope proceeds through channel bit 24, before tapering off and changing polarity in channel bits 25–28. This "long mark" circumstance typically can arise when the recorded marks are generally relatively smaller in size than the spaces and, particularly, when the pattern of marks provides for reduced reflection (the reflection generally has a canceling effect on the amplitude of the read signal). Generally, employing both upper and lower clip levels provides for enhanced detection over a relatively large range of mark-size to space-size ratios.

For read signals as shown in FIG. 1 (*b*), the upper portion of the read signal is clipped at a selected upper clip level. The upper clip level preferably is derived from a selected first set of samples associated with the reference marks. The upper clip level preferably constrains the relevant slopes to cover an optimally small maximum number of channel bits, e.g., to one or two channel bits. As shown in FIG. 1 (*b*), the clipped read signal retains the significant slope of channel bits 22–23, while the proceeding slope of channel bits 23–24 is reduced to a small step so that the signal continues therefrom at the upper clip level.

For read signals as shown in FIGS. 1 (*a*) and (*b*), the lower portion of the read signal is clipped at a selected lower clip level. The lower clip level preferably is derived from a selected second set of samples associated with the reference marks. The lower clip level preferably also constrains the slopes to cover an optimally small maximum number of channel bits, e.g., to one or two channel bits.

For each of upper and lower clipping, it is understood by one of ordinary skill in the art that no information is to be lost in the clipping process.

The reference marks can be variously provided. The reference marks preferably comprise either or both (i) a selected number of predetermined marks located in one or more of the frames and (ii) preamble bytes associated with each sector. These predetermined marks and preamble bytes have patterns selected to optimize the clipping function.

In one embodiment, the predetermined marks comprise two marks located in a frame's recordable field and covering twelve channel bits, as shown in FIG. 1. In this embodiment, the predetermined marks preferably are repeated in each frame such that they are interleaved in the user data, i.e., the user data of one logical sector is stored in plural frames and each frame includes the predetermined marks.

In another embodiment, the preamble bytes preferably are twelve in number (e.g., where the user data bytes are 2048 in number) and comprise two marks per byte (i.e., 24 total marks), all of which marks are located in the recordable field of the first frame associated with the sector.

In another embodiment, the preamble bytes correspond to the predetermined marks. For example, the two predetermined marks are employed 1 to 12 times in the sector's first frame in providing the preamble. In so doing, a clip level can be derived based on one or more algorithms and using redundant reference mark information. That is, if the preamble consists of 12 occurrences of the predetermined marks, the samples can be averaged over the 12 bytes in deriving a clip level at the beginning of each sector and a clip level, so derived, is subject to adjustment based on the predetermined marks located in one or more frames subsequent to the first frame of the sector.

Although the reference marks can be provided as specifically described above, it is understood that such marks can be otherwise provided without departing from the principles of the invention. For example, while the above-description locates the reference marks in the recordable fields of the frames, it is understood that some or all of the marks can be provided as preformatted marks. However, it is preferred that the marks are recorded with the user data in the recordable field so that the reference marks are subject to write parameters prevailing as the user data is written.

In one embodiment, each of the upper and lower clip levels preferably is derived from averaging respective first and second sets of samples associated with the reference marks. As an example, the upper clip and lower clip levels can be derived from, respectively, (i) the average of samples 4,5, 8 and 9 and (ii) the average of samples 3 and 10, this latter average illustrated in FIG. 1 (*a*) as clip level "A".

It is contemplated to obtain these averages by well understood algorithms. As an example, the lower clip level is obtained by (i) digitizing the read signal via an appropriately fast analog-to-digital converter, (ii) acquiring sample 3 for storage in a register, (iii) acquiring sample 10, (iv) adding sample 10 to sample 3 in the register and (v) shifting the result of the addition one bit, thereby obtaining the average of the addition's result.

Figure 3:
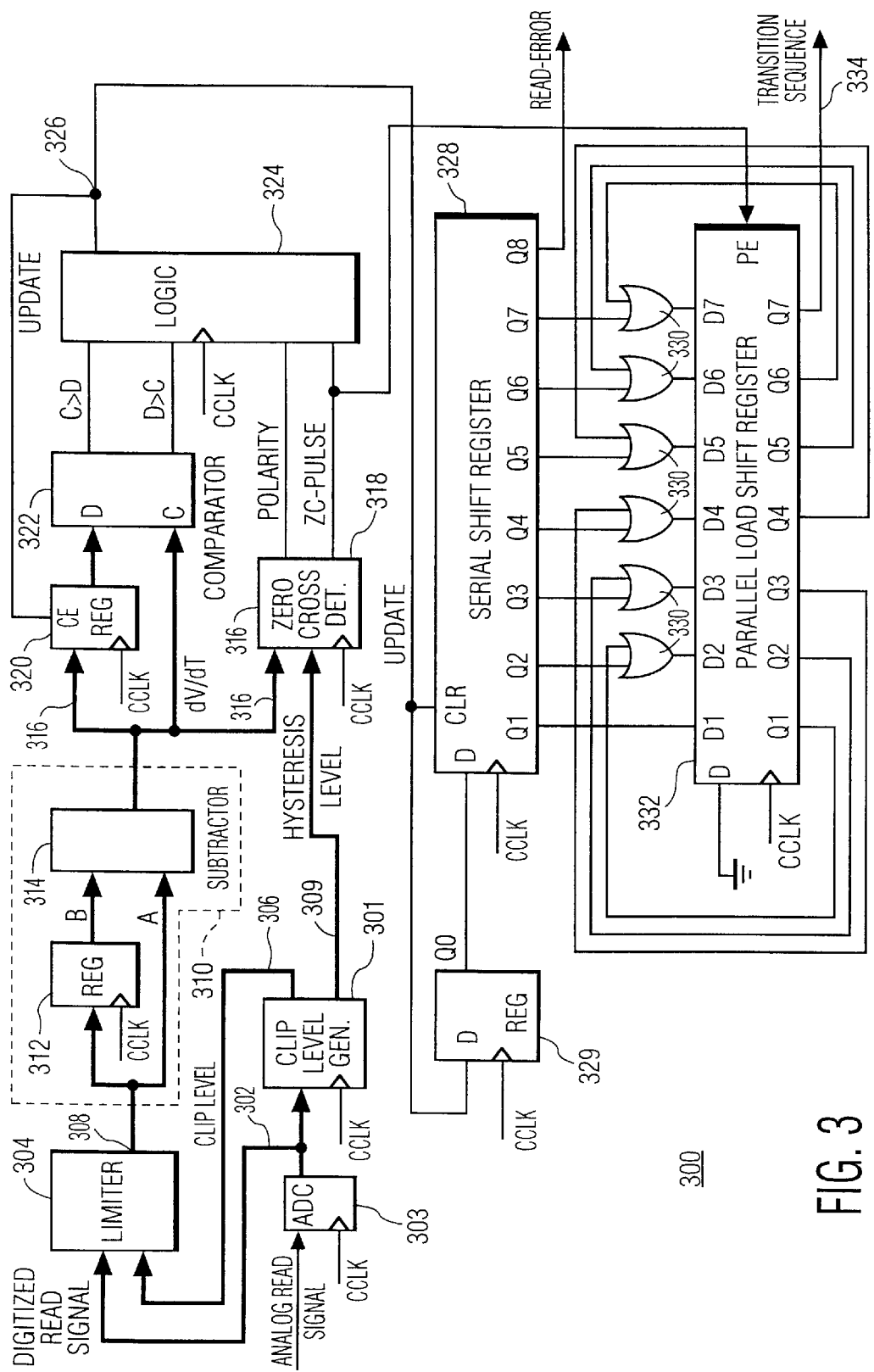
FIG. 3 is a block diagram of a maximum likelihood detector associated with the read channel, in accordance with the present invention.

The process of providing the clip level(s) preferably is provided using an ADC 303 and a clip level generator 301, as illustrated in FIG. 3. In FIG. 3, either/both the lower and upper clip levels are referenced as a clip level 306.

In alternative embodiments of the present invention, the clip levels preferably are offset by a predetermined amount or by a predetermined calculus from the average of the selected samples. As an example, the upper clip level is the average of samples 4, 5, 8 and 9, plus a selected amount. This is illustrated in FIG. 1 (*b*) by the upper clip level being disposed above each of the averaged samples. As another example, the lower clip level in one such alternative embodiment is the average of samples 3 and 10, less a selected amount (illustrated in FIG. 1 as clip level "B"). Preferably, the offset is common for both the upper and lower clip levels.

In setting an offset, the selected amount preferably is determined based on factors which tend to enhance the clipping function and the results therefrom. For example, the selected amount is to allow for amplitude variation among or within frames and sectors. In one embodiment, the amount of the offset is selected as (1/x)(samples [5+8]–samples [3+10]), where x=4. It is understood not only that other offset formulae may be employed, but also that, in this offset formula, "x" can be other than 4 (e.g., 3 or lesser, 5 or greater) or other samples can be used.

Notwithstanding the above arrangements for setting clip levels, it is understood that other arrangements can be implemented (e.g., interpolation, multiple alternative computations, and the like) without departing from the principles of the invention.

FIGS. 1 (a) and (b) also illustrates that clip levels preferably are applied only to the data marks of the read signal.

ML Detector

An ML detector 300 in accordance with the present invention is shown in FIG. 3. A read signal is presented to an analog-to-digital converter (ADC) 303 which generates a digitized read signal 302. The digitized read signal 302 is presented to a limiter 304 in parallel digital format, e.g., as an 8-bit wide bus. One or more selected clip levels 306 are presented to the limiter 304. Limiter 304 compares clip levels 306 and read signal 302. In the case of an upper clip level, the limiter 304 passes the lesser of the two values to its output port 308; in the case of a lower clip level, the limiter 304 passes the greater of the two values to its output port 308.

The output signal of the limiter 304 is transmitted via output port 308 to a digital differentiator 310. Digital differentiator 310 includes a memory element 312, and a subtractor 314. In the illustrative embodiment of the present invention shown in FIG. 3, memory element 312 is wide enough to latch all the bits available at output port 308 at a given clock cycle. Memory element 312 is one bit deep, which is enough to serve its purpose of introducing a one clock cycle delay.

The digital differentiator 310 is implemented to provide a measure of the rate of change of voltage with respect to time, dV/dT. In the illustrative embodiment, this differentiation is accomplished by subtracting the previous value of the clipped read signal (stored in memory element 312) from the present value of the clipped read signal (received from output port 308).

It is to be recognized that the differentiator 310 can be implemented to accomplish differentiation using other techniques, without departing from the principles of the invention. As an example, the differentiation can be accomplished by subtracting the present value from the previous value of the clipped read signal. As another example, subtraction can be of values that are not adjacent. As yet another example, differentiation can employ more than one method (, e.g., using two subtractions).

The result of the differentiation, dV/dT, is transmitted via bus 316 to a zero cross detector 318. Zero cross detector 318 determines the polarity of dV/dT and generates a polarity signal. Based on changes in polarity, the zero cross detector 318 also generates a pulse (zc-pulse), such pulse indicating each time that dV/dT crosses the zero level. The polarity signal and the pulse are presented to a logic function block 324. The pulse is also presented to a parallel load shift register 332.

To prevent a false zero cross detection (e.g., due to noise), it is preferable that the zero cross detector 318 apply some amount of hysteresis in generating its pulse. To do so, it is preferred that the clip level generator 301 generates a hysteresis signal 309, which signal is provided to the zero cross detector 318. It is preferred that the hysteresis be derived from the reference marks. In one case, the hysteresis is (1/x)(samples [5+8]–samples [6+7]), where x=4. It is understood not only that other hysteresis formulae may be employed, but also that, in this hysteresis formula, "x" can be other than 4 (e.g., 3 or lesser, 5 or greater) or other samples can be used. Responsive to each zero cross detection, a register 320 is loaded with a first value of dV/dT. At the next clock cycle, the present value of dV/dT is compared to the value stored in the register 320 by a comparator 322. (As is understood from the following discussion, register 320 and comparator 322 are collectively referred as a min/max detector.)

If the polarity signal indicates dV/dT's polarity is positive, the logic function block 324 checks the output of comparator 322 to determine whether the comparator 322 has identified the present value of dV/dT to be greater than the stored value of dV/dT. If so, the logic function block 324 asserts the signal UPDATE, which signal is transmitted to a node 326 for application to register 320, such that the present value of dV/dT is loaded into register 320. This process continues until the next zero crossing of dV/dT is detected.

If the polarity signal indicates dV/dT's polarity is negative, the logic function block 324 checks the output of comparator 322 to determine whether the comparator 322 has identified the stored value of dV/dT to be greater than the present value of dV/dT. If so, the logic function block 324 asserts the signal UPDATE, which signal is applied to register 320, such that the present value of dV/dT is loaded into register 320. This process continues until the next zero crossing of dV/dT is detected.

In the illustrative embodiment shown in FIG. 3, a flip flop 329, a serial shift register 328 and a parallel load shift register 332 are used to keep track of the position of the maximum or minimum value of dV/dT between any two zero crossings. The flip flop 329 and the serial shift register 328 are coupled to the logic function block 324 so as to receive the UPDATE signal. Accordingly, whenever register 320 is updated in response to assertion of the UPDATE signal (including the first channel bit after a zero crossing), a logical one is loaded into the flip flop 329 as bit $Q_0$. At substantially the same time that the logical one is loaded into $Q_0$, all the bits (e.g., $Q_1$ through $Q_8$) of serial shift register 328 are cleared to a logical zero. In this way, serial shift register 328 will contain only a single logical one during operation, as there can only be one maximum/minimum between zero crossings. As shown in FIG. 3, the UPDATE signal preferably is employed to so clear the serial shift register. In any case, a serial shift register with a single logical one shifting through it is sometimes referred to as a walking one shift register.

The parallel load shift register 332 is coupled to the zero cross detector 318 so as to receive the zc-pulse. Accordingly, when a pulse (zc-pulse) is generated by zero crossing detector 318, the contents of serial shift register 328 are synchronously transferred to the parallel load shift register 332, in such a way that any logical ones that are already in parallel load shift register 332 are maintained in that register. For example, and referring to FIG. 3, a logical one in bit $Q_4$ of the parallel load shift register 332 is transferred to bit $Q_5$ as a result of the parallel load action. Logical OR gates 330 provide the pathway from $Q_n$ to $Q_{n+1}$ of the parallel load shift register 332.

The output 334 of parallel load shift register 332 bit $Q_7$, represents the transition sequence. The transition sequence is a string of logical ones and zeroes in which ones indicate the locations of transitions of the sequence of run-length-limited (RLL) modulation code. Together flip flop 329, shift registers 328, 332 and logical OR gates 330 are referred to as the channel bit transition generator.

The length of each shift register 328, 332 preferably is selected in relation to the k-constraint of the employed modulation code. For example, the 1,7RLL code has a maximum string of ones or zeroes of eight and the shift registers 328, 332 preferably are selected to have a length of seven bits. However, the shift registers 328, 332 can be selected to have greater lengths. For example, by selecting a serial shift register 328 having a length of eight bits in a 1,7RLL system, the eighth bit can be monitored for a logical one state which state indicates violation of the k-constraint and thereby flags an error (as shown in FIG. 3 as the "Read-Error" signal). Such error flagging can be used, e.g., by an ECC decoder. In normal operation, the eight-bit serial shift register 328 would be cleared by a new update before the eighth bit's state becomes a logical one.

Conclusion

The present invention provides methods and apparatus for recovering data from an optical media, including, for example, optical disk, optical tape, and magneto-optical systems.

An advantage of embodiments of the present invention is that the locations of the channel bit transitions are found without the use of a detection threshold (also known as "slice level").

A further advantage of embodiments of the present invention is that more information can be stored on the optical medium because less phase and amplitude margin are required for successfully recovering data.

It will be understood that various other changes in the details, materials, and arrangements of the parts and steps which have been described and illustrated in order to explain the nature of this invention may be made by those skilled in the art without departing from the principles and scope of the invention as expressed in the subjoined claims.

What is claimed is:

1. A method of recovering data from an optical read channel, the method comprising:

digitizing a plurality of samples of a first signal read from the optical read channel;

clipping the digitized samples of the first signal;

digitally differentiating the clipped digitized samples so as to produce differentiated signals;

determining relative locations of signal polarity changes in association with the first signal based on the differentiated signals; and generating logical values for channel bits based, at least in part, on the relative locations of the signal polarity changes.

2. The method of claim 1, wherein the first signal is an analog user data read signal.

3. The method of claim 1, wherein clipping comprises employing at least one of an upper clip level and a lower clip level digitized samples of the first signal.

4. The method of claim 3, further comprising generating the clip level.

5. The method of claim 4, wherein generating the clip level comprises:

receiving an analog reference signal;

digitizing at least two samples of the analog reference signal;

setting the clip level to a value approximately equal to the average of the at least two samples of the analog reference signal.

6. The method of claim 4, wherein generating the clip level comprises:

receiving an analog reference signal;

digitizing at least two samples of the analog reference signal; and setting the clip level to the average of the at least two samples of the analog reference signal, less a selected amount.

7. The method of claim 6, further comprising deriving the selected amount from the reference marks.

8. The method of claim 7, wherein the step of deriving the selected amount from the reference marks comprises using the formula (1/x)(samples [5+8]−samples [3+10]), where x=4.

9. The method of claim 8, wherein x is other than 4.

10. The method of claim 4, further comprising generating an analog reference signal based on selected reference marks, the reference marks being at least one of (i) a selected number of predetermined marks located in one or more frames of an optical medium and (ii) preamble bytes associated with one or more sectors of the optical medium corresponding to the first signal.

11. The method of claim 10, wherein at least one of the predetermined marks and the preamble bytes have patterns selected to optimize the clipping function.

12. The method of claim 10, wherein the predetermined marks are repeated in one or more selected frames.

13. The method of claim 10, wherein the preamble bytes correspond to the predetermined marks.

14. The method of claim 1, wherein digitally differentiating comprises subtracting a first digital value from a second digital value.

15. The method of claim 1, wherein digitally differentiating comprises:

delaying a first clipped digitized sample by a selected amount; and subtracting the delayed first clipped digitized sample from a second clipped digitized signal.

16. The method of claim 1, wherein determining the relative locations of signal polarity changes comprises:

comparing the signs of two consecutive digital differentiations and generating a signal that indicates a zero-crossing when signs of the two consecutive digital differentiations are different.

17. The method of claim 16, wherein determining the relative locations of signal polarity changes further comprises:

detecting the maximum and minimum clipped digital samples between zero-crossings; and providing a sequence of logical bits wherein one logical bit corresponds to the detected maximum or minimum.

18. The method of claim 17, wherein determining the relative locations of signal polarity changes further comprises:

logically combining a plurality of the provided sequences of logical bits responsive to plural zero crossings.

19. A method of recovering data from an optical read channel, comprising:

receiving an analog reference signal;

digitizing at least two samples of the analog reference signal;

generating at least one of an upper clip level or lower clip level, each of said clip levels being representative of the average of the at least two samples;

receiving an analog user data read signal;

digitizing a plurality of samples of the analog user data read signal;

employing the clip level to clip each of the digitized samples of the user data read signal;

subtracting a first clipped digitized sample from a second clipped digitized sample, wherein the first clipped digitized sample is obtained earlier in sequence than the second clipped digitized sample;

subtracting the second clipped digitized sample from a third clipped digitized sample, wherein the second clipped digitized sample is obtained earlier in sequence than the third clipped digitized sample;

repeating the step of subtracting the second clipped digitized sample for successive clipped digitized samples;

comparing the signs from the result of the subtraction of subtracting steps to determine the relative locations of signal polarity changes; and generating logical values for channel bits based, at least in part, on the relative locations of the signal polarity changes.

\* \* \* \* \*